United States Patent
Han

(10) Patent No.: US 7,554,890 B2
(45) Date of Patent: Jun. 30, 2009

(54) APPARATUS AND METHOD FOR CONTROLLING WRITING POWER OF OPTICAL DISC

(75) Inventor: Cheul Kyung Han, Sungnam-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 413 days.

(21) Appl. No.: 10/790,728

(22) Filed: Mar. 3, 2004

(65) Prior Publication Data

US 2004/0228243 A1 Nov. 18, 2004

(30) Foreign Application Priority Data

Mar. 4, 2003 (KR) .................... 10-2003-0013520

(51) Int. Cl.
G11B 7/00 (2006.01)

(52) U.S. Cl. .................................. 369/47.53; 369/116

(58) Field of Classification Search .............. 369/47.53, 369/116
See application file for complete search history.

(56) References Cited

U.S. PATENT DOCUMENTS

| 6,904,009 | B2* | 6/2005 | Mashimo et al. ........... 369/47.5 |
| 7,095,691 | B2* | 8/2006 | Takeda ....................... 369/47.53 |
| 2002/0024903 | A1* | 2/2002 | Sato ........................... 369/47.53 |
| 2002/0064110 | A1* | 5/2002 | Sato ........................... 369/47.53 |
| 2002/0114244 | A1* | 8/2002 | Kelly et al. ............... 369/53.37 |
| 2002/0126603 | A1* | 9/2002 | Kim ........................... 369/47.53 |
| 2003/0007435 | A1 | 1/2003 | Fukumoto |
| 2003/0036861 | A1* | 2/2003 | Matsumoto ................... 702/60 |
| 2003/0043711 | A1* | 3/2003 | Mashimo et al. .......... 369/47.39 |
| 2003/0043714 | A1* | 3/2003 | Takeda ....................... 369/47.53 |
| 2003/0048712 | A1* | 3/2003 | Bakx et al. ................ 369/47.53 |
| 2003/0072233 | A1* | 4/2003 | Naoi et al. ................. 369/47.53 |
| 2003/0161237 | A1* | 8/2003 | Ogawa ....................... 369/47.53 |
| 2004/0141442 | A1* | 7/2004 | Suzuki ....................... 369/47.53 |
| 2005/0122868 | A1* | 6/2005 | Kim ........................... 369/47.53 |
| 2005/0157620 | A1* | 7/2005 | Narumi et al. ............. 369/47.53 |

FOREIGN PATENT DOCUMENTS

| CN | 1393858 A | 1/2003 |
| KR | 10-2002-0052811 A | 7/2002 |
| KR | 10-2002-0089646 A | 11/2002 |

* cited by examiner

Primary Examiner—Wayne R Young
Assistant Examiner—Linh T Nguyen
(74) Attorney, Agent, or Firm—Birch, Stewart, Kolasch & Birch, LLP

(57) ABSTRACT

A method for recording data on an optical disc, includes detecting optimum writing power from a test area on the optical disc; determining whether or not a current writing power is within a predetermined allowable range set with reference to the detected optimum writing power; and performing a writing operation with the writing power controlled to maintain a reflection signal level corresponding to the detected optimum writing power when the current writing power is within the predetermined allowable range, and performing the writing operation with the writing power controlled based on power update information when the current writing power is not within the predetermined allowable range.

17 Claims, 5 Drawing Sheets

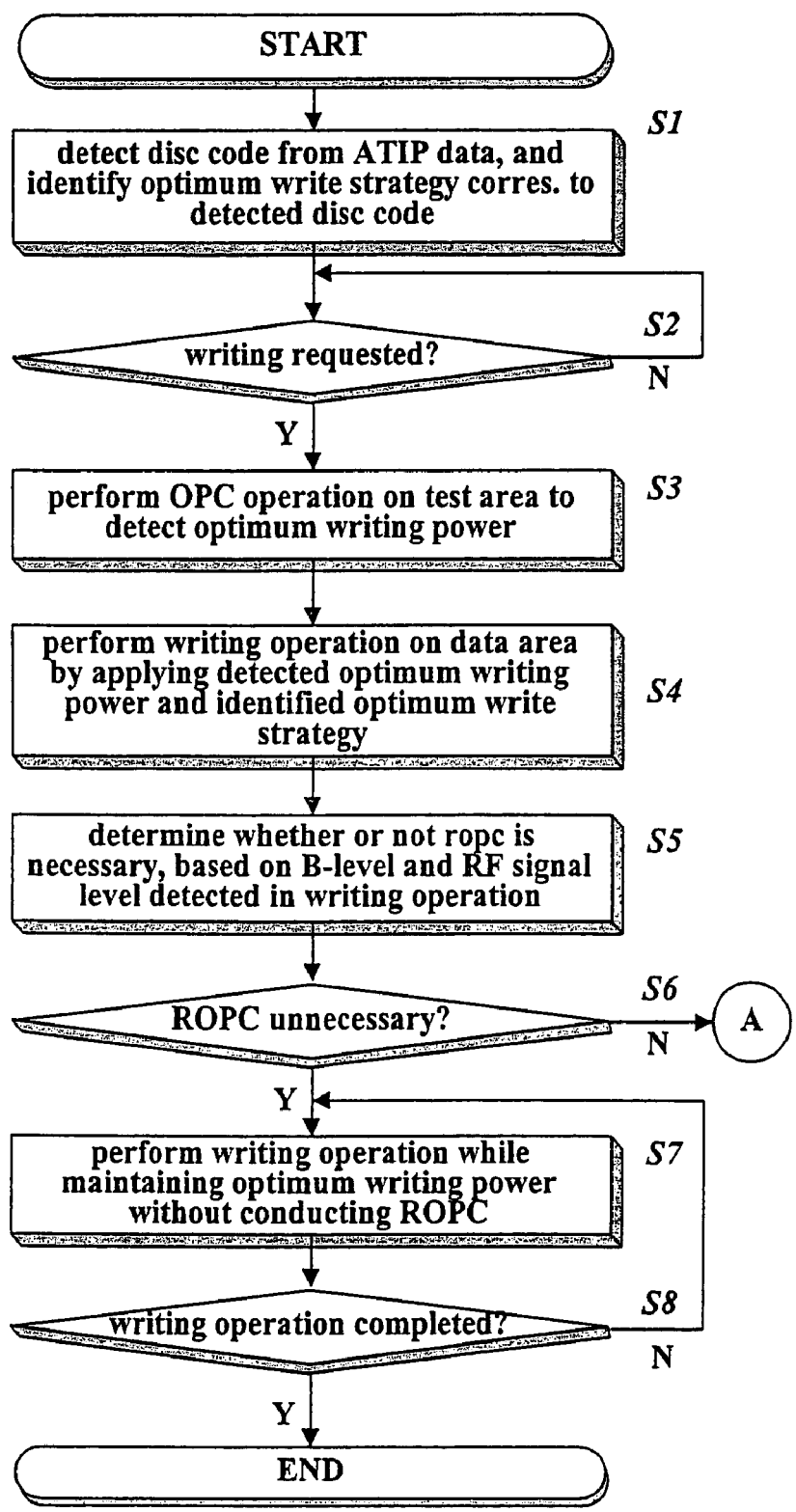

*Disc Type : 4X*

| writing speed | position p | power variation rate |
|---|---|---|
| 8X | 70 : 00 : 00 | 0.01mW/min |
| 16X | 45 : 00 : 00 | 0.05mW/min |
| 32X | 20 : 00 : 00 | 0.08mW/min | ns
APPARATUS AND METHOD FOR CONTROLLING WRITING POWER OF OPTICAL DISC

This non-provisional application claims priority under 35 U.S.C. § 119(a) on Patent Application No. 03-13520 filed in Korea on Mar. 4, 2003, which is herein incorporated by reference.

BACKGROUND OF THE INVENTION

1. Field of the Invention

The present invention relates to an apparatus and method for controlling the writing power of an optical disc and more particularly to an apparatus and method for controlling the writing power of an optical disc that takes into consideration a material characteristic deviation between the inner and outer peripheral portions of the optical disc, so as to write data on the optical disc in an optimal state.

2. Description of the Related Art

FIG. 1 illustrates a configuration of a related art optical disc recording/reproducing apparatus. As shown in FIG. 1, the related art recording/reproducing apparatus includes a digital write signal processor 30a which adds an error correction code (ECC) to input digital data, thereby converting the input digital data to have a desired writing format. A channel bit (CB) encoder 40 re-converts the data, previously converted by the digital write signal processor 30a to have the desired writing format, into a write signal in the form of a bit stream. An optic drive 41 outputs a drive signal with a light amount controlled in accordance with a control signal applied thereto. An optical pickup 20 writes the bit stream on an optical disc 10 in accordance with the drive signal, and detects a signal written on the optical disc 10 in the form of a radio frequency (RF) signal. The optical disc 10 may be a recordable compact disc (CD-R), for example.

The recording/reproducing apparatus also includes an RF processor 50 which filters and shapes the RF signal detected by the optical pickup 20 to output a binary signal. A first level detector, indicated as "Level Detector 1," 51 detects the level (B-level) of a signal reflected from a mark area on the optical disc 10 in a writing operation. A second level detector 52, indicated as "Level Detector 2", detects the level (RF-level) of the RF signal outputted from the R/F processor 50. A wobble signal detector 53 detects a wobble signal from the reflection signal outputted from the optical pickup 20. An absolute time in pre-groove (ATIP) decoder 54 decodes the wobble signal at the point in time when a particular reproduction pulse duration (for example, 5T) is detected, thereby detecting ATIP data.

The recording/reproducing apparatus further includes a drive unit 60 for driving the optical pickup 20 and a spindle motor 11. A servo unit controls the drive unit 60 in accordance with servo signals. The servo signals include a focusing error (FE) signal and a tracking error (TE) signal. A digital reproduction signal processor 30b recovers the binary signal using a clock phase-synchronized with the binary signal. A microcomputer 70 controls a recording/reproducing operation for the optical disc 10, and also controls the level of writing power in the writing operation.

The microcomputer 70 includes an internal ROM 71 stored with information about optimal write strategies corresponding to respective disc codes for various disc types.

FIGS. 2a and 2b are flow charts illustrating a related art data recording method carried out in the general optical disc recording/reproducing apparatus of FIG. 1. The recording method of FIGS. 2a and 2b is described hereinafter with reference to the configuration of FIG. 1.

When the optical disc 10 is loaded into the recording/reproducing apparatus and subsequently rotated, the optical pickup 20 detects a reflection signal generated as a main beam which is reflected from the optical disc 10. The optical pickup 20 outputs the detected reflection signal to the wobble signal detector 53. The wobble signal detector 53, in turn, detects a wobble signal from the reflection signal. On the other hand, the ATIP decoder 54 samples and decodes the wobble signal at the point in time when a particular reproduction pulse duration is detected, thereby detecting ATIP data. Even when the wobble signal corresponding to a short reproduction pulse duration is sampled, ATIP data can be detected because the ATIP data is low-frequency-modulated data.

The microcomputer 70 detects a disc code from the detected ATIP data, and identifies, in the internal ROM 71, an optimal write strategy corresponding to the detected disc code in step S1 of FIG. 2a.

If a writing operation is subsequently requested in step S2, the microcomputer 70 performs an optimal power calibration (OPC) operation which detects an optimal writing power at a test area on the inner peripheral portion of the optical disc 10 in step S3. The microcomputer 70 stores the detected optimal writing power and an optimal reflection signal level (B-level) corresponding to the detected optimal writing power.

Thereafter, the microcomputer 70 performs a writing operation at a data area on the optical disc 10 by applying the detected optimal writing power and the identified optimal write strategy in step S4. In the writing operation, the first level detector 51 detects the level of a signal caused by reflection of a write beam, that is, the level of a reflection signal, or the B-level, reflected from the mark area. The second level detector 52 detects the level of an RF signal output from the RF processor 50. At this time, the first level detector 51 detects the B-level of the reflection signal at the point in time when a variation in characteristics of the optical disc medium caused by the write beam is stabilized, for example, at a reproduction pulse duration of 11 T.

The microcomputer 70 determines whether or not a running OPC (ROPC) operation is to be carried out, based on the detected B-level and RF signal level in step S5. If it is determined that it is unnecessary to carry out the ROPC operation in step S6, the microcomputer 70 performs a writing operation while maintaining the optimal writing power detected in accordance with the OPC operation, without performing any ROPC operation in steps S7 and S8.

FIG. 3 depicts a variation in writing power depending on a material characteristic deviation between the inner and outer peripheral portions of an optical disc. Where the optical disc 10 has little material characteristic deviation between its inner and outer peripheral portions, which is indicated as "A" in FIG. 3, it is possible to obtain a desired RF signal level and a desired jitter quality at both the inner and outer peripheral portions of the optical disc 10 even when writing of data is carried out under a condition in which the detected optimal writing power is maintained, without execution of any ROPC operation.

If it is determined in step S5 that it is necessary to carry out an ROPC operation, the microcomputer 70 performs the ROPC. operation until the writing operation is completed in steps S9 and S12. If writing of data is carried out under a condition in which the detected optimal writing power is maintained, and where the optical disc 10 has a substantial material characteristic deviation between its inner and outer peripheral portions, which is indicated as "B" or "B'" in FIG. 3, it is impossible to obtain a desired RF signal level and a desired jitter quality. Thus, a degradation in reproduction characteristics occurs. In order to avoid such a problem, therefore, the microcomputer 70 performs the ROPC operation, based on the detected levels.

The ROPC operation is adapted to continuously adjust the writing power, based on the B-level at the point in time when a variation in characteristics of the optical disc medium caused by the write beam in a writing operation is stabilized, such that the writing power is equal to the detected and stored level of the reflection signal generated at the test area. Since the ROPC operation is effective within an allowable range set with reference to the optimal writing power, it is possible to provide a reproduction signal with a stable level even for an optical disc having a substantial material characteristic deviation between its inner and outer peripheral portions.

However, where an optical disc operating in a low speed mode (for example, at 4X, where 'X' denotes a basic reference speed) performs a writing operation in a higher speed mode (for example, at 32X), its writing power is outside of an ROPC margin range from a point substantially corresponding to a point P of FIG. 3 during the ROPC operation, under a condition in which the optical disc has a large material characteristic deviation between its inner and outer peripheral portions (indicated as "C" or "C'" in FIG. 3) in step S10. In this case, write failure may occur because there may no longer be any signal discrimination ability in step S11. Even when there is no write failure, it is impossible to reproduce written signals.

SUMMARY OF THE INVENTION

The present invention is made in view of the above circumstances and an object of the invention is to provide an apparatus and method for controlling the writing power of an optical disc that substantially obviates the disadvantages of the related art optical disc recording/reproducing apparatus.

It is an object of the present invention is to provide an apparatus and method for controlling the writing power of an optical disc which is capable of achieving an optimum data writing operation without any write failure even for an optical disc having a large material characteristic deviation between its inner and outer peripheral portions.

In order to achieve this and other objects, the present invention in one aspect provides a method for recording data on an optical disc, including detecting optimum writing power from a test area on the optical disc; determining whether or not a current writing power is within a predetermined allowable range set with reference to the detected optimum writing power; and performing a writing operation with the writing power controlled to maintain a reflection signal level corresponding to the detected optimum writing power when the current writing power is within the predetermined allowable range, and performing the writing operation with the writing power controlled based on power update information when the current writing power is not within the predetermined allowable range.

In accordance with another aspect, the present invention provides an apparatus for recording data on an optical disc, including a determining unit for determining, in a writing operation of the writing means, whether or not current writing power is within a predetermined allowable range set with reference to optimum writing power; controller for controlling the writing power to maintain a reflection signal level corresponding to the optimum writing power when the current writing power is within the predetermined allowable range based on the result of the determining unit, and controlling the writing power based on power update information when the current writing power is not within the predetermined allowable range; and writing unit for performing a writing operation with the controlled writing power to write input data to the disc using writing power.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2a and 2b are flow charts illustrating a related art data recording method carried out in the general optical disc recording/reproducing apparatus of FIG. 1;

DESCRIPTION OF THE PREFERRED EMBODIMENTS

Figure 1:
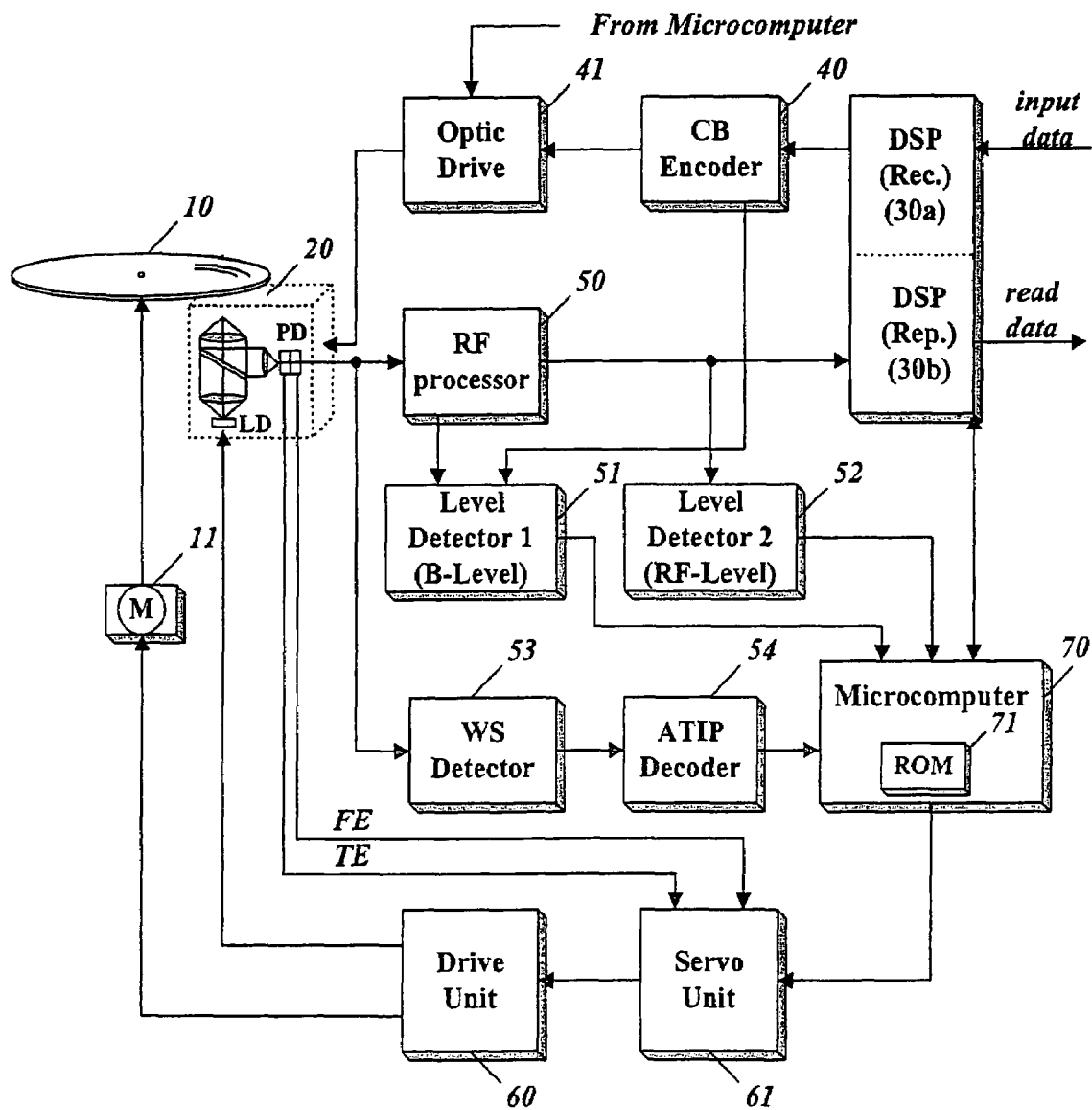
FIG. 1 is a block diagram illustrating the configuration of a related art optical disc recording/reproducing apparatus.

Referring now to the drawings, wherein like reference numerals designate identical or corresponding parts throughout the several views, the configuration of an optical disc recording/reproducing apparatus in accordance with the embodiment of the present invention, in which the apparatus for controlling the writing power of an optical disc is embodied, is similar to that of FIG. 1, with notable exceptions. The ROM 71 is further stored with power update information in accordance with the present invention. The microcomputer 70 is configured to control the writing power, based on the power update information selectively given in accordance with the material characteristic deviation between the inner and outer peripheral portions of the optical disc. These features will be described in detail hereinafter.

Figure 4A:
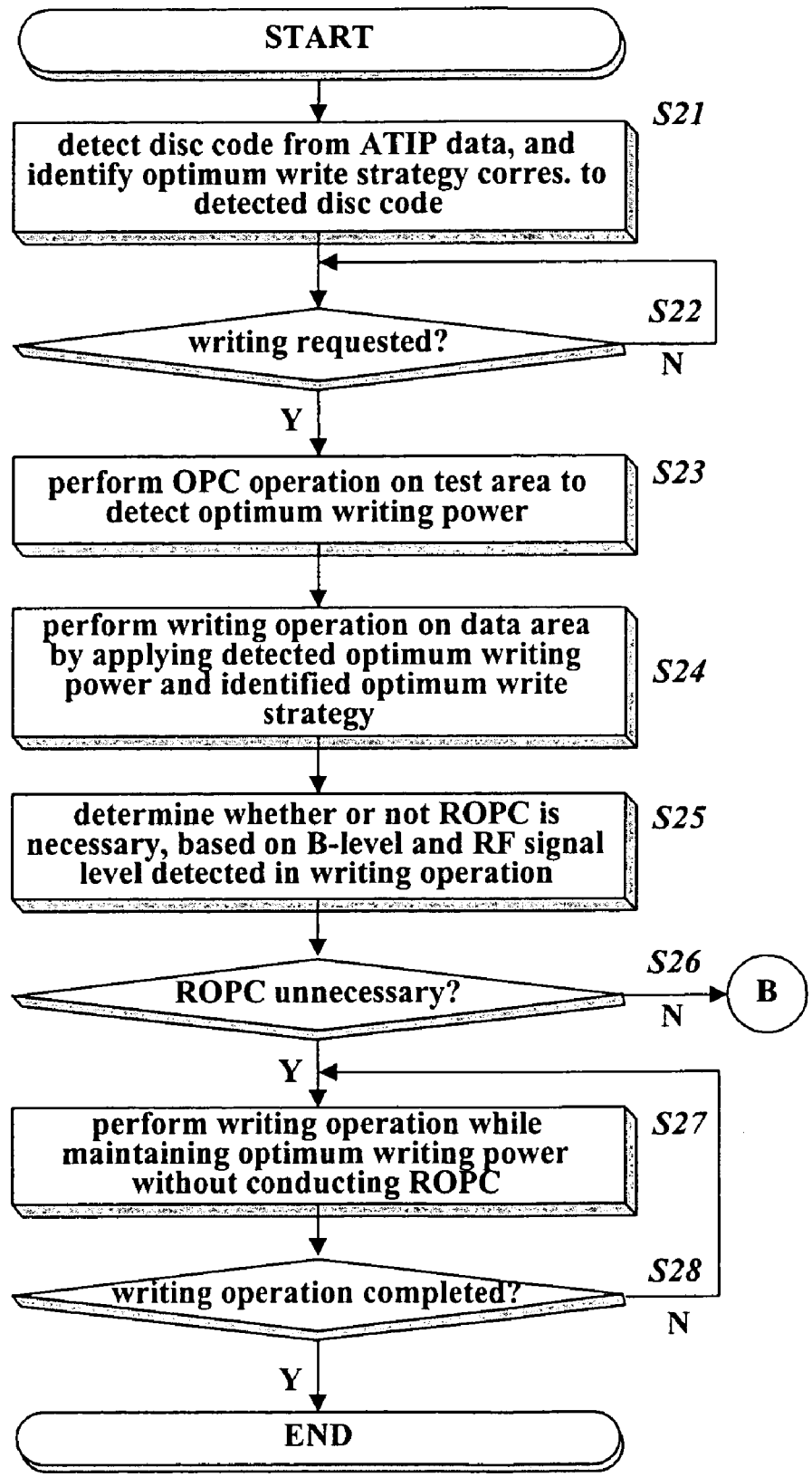
FIGS. 4a and 4b are flow charts illustrating a method for controlling the writing power of an optical disc in accordance with a preferred embodiment of the present invention.
Figures 4B, 5:
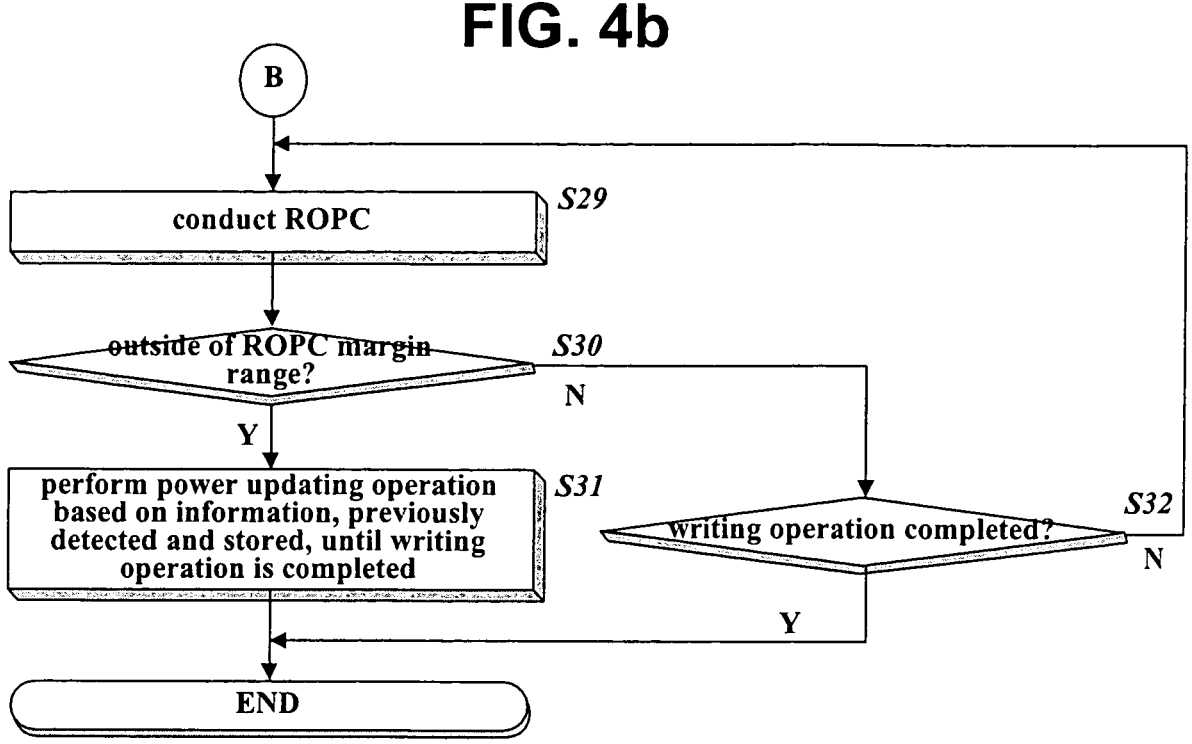
FIG. 5 is a table illustrating an example of power update information stored in accordance with the present invention.

FIGS. 4a and 4b are flow charts illustrating a preferred embodiment of the method for controlling the writing power of the optical disc in accordance with the present invention. The writing power controlling method of FIGS. 4a and 4b will now be described in detail in conjunction with the operation of the apparatus shown in FIG. 1.

In accordance with the present invention, a search is first performed to find optical discs, each having a large material deviation between its inner and outer peripheral portions, in the manufacture of the optical disc recording/reproducing apparatus. For each of the searched optical discs, a detection is carried out to detect the point where the writing power is outside of an ROPC margin range which may be, for example, a point P in FIG. 3, and a variation in writing power per a unit time occurring from the point. The detected point and writing power variation rate are additionally stored as power update information in association with an associated disc code and/or writing speed in the ROM 71 stored with information about optimum write strategies.

For example, the power update information additionally stored in the ROM 71 may be "Disc A-Writing power Increase of 0.1 mW per Minute from Point P."

Accordingly, when the optical disc 10 is loaded into the recording/reproducing apparatus, and subsequently rotated, the microcomputer 70 detects a disc code from ATIP data detected from the optical disc 10, and identifies an optimum write strategy corresponding to the detected disc code from the internal ROM 71 in step S21.

Figure 2B:
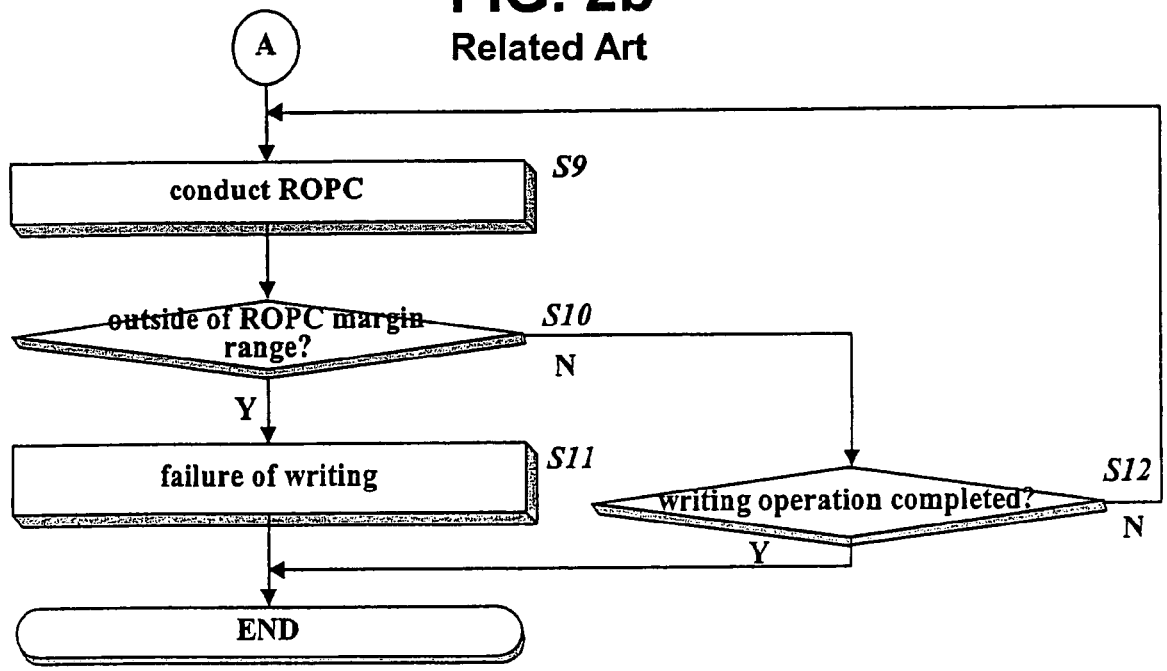

If a writing operation is subsequently requested in step S22, the microcomputer 70 performs the same procedure as the steps of FIGS. 2a and 2b. That is, the microcomputer 70 performs an OPC operation, thereby detecting and storing an optimum writing power and an optimum reflection signal level, or B-level, corresponding to the optimum writing power in step S23. The microcomputer 70 subsequently performs a writing operation on the data area of the optical disc 10, using the detected optimum writing power and the identified optimum write strategy in step S24. During the writing operation, the microcomputer 70 determines whether or not an ROPC operation is to be carried out, based on the detected B-level and RF signal level detected by the first and second level detectors 51 and 52, respectively, in step S25.

Figure 3:
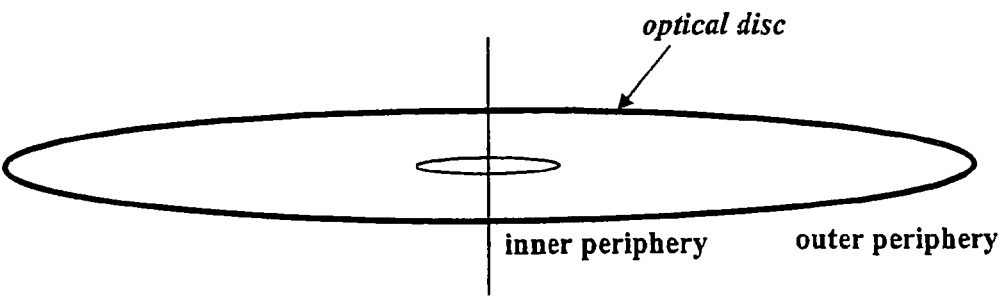
FIG. 3 is a diagram depicting a variation in writing power depending on a material characteristic deviation between the inner and outer peripheral portions of an optical disc.
Figure 3:
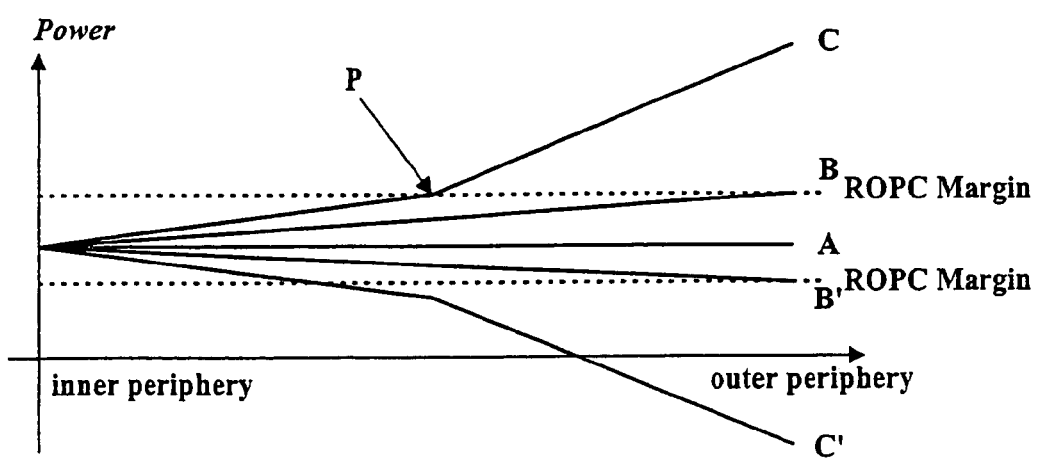

If it is determined that it is unnecessary to carry out the ROPC operation in step S26, that is, where the optical disc 10 has little material characteristic deviation between its inner and outer peripheral portions, indicated as "A" in FIG. 3, the microcomputer 70 performs a writing operation while maintaining the optimal writing power detected in accordance with the OPC operation until the writing operation is completed in steps S27 and S28. On the other hand, if it is determined that it is necessary to carry out an ROPC operation, that is, where the optical disc 10 has a substantial material characteristic deviation between its inner and outer peripheral portions indicated as "B" or "B'" in FIG. 3, the microcomputer 70 performs the ROPC operation until the writing operation is completed in steps S29 and S32.

Where the optical disc 10 is adapted for a low speed mode (for example, at 4X) while having a large material characteristic deviation between its inner and outer peripheral portions, its writing power may be outside of an ROPC margin range when a writing operation is carried out for the optical disc in a higher speed mode (for example, at 32X). When the writing power is outside of the ROPC margin range from a point substantially corresponding to the point P in FIG. 3, indicated as "C" or "C'" in FIG. 3 in step S30, the microcomputer 70 stops the ROPC operation, and performs a power updating operation in step S31. This procedure is carried out as follows.

First, the microcomputer 70 detects, from the ROM 71 the power update information stored in association with the detected disc code.

Thereafter, the microcomputer 70 performs the writing operation while varying the writing power at intervals of a certain time until writing of data is completed, based on the detected power update information, and continuously identifying the current time information on the optical disc 10 from ATIP data detected by the ATIP decoder 54. For example, the microcomputer 70 performs the writing operation while increasing the writing power by 0.1 mW per minute, based on the detected power update information. The writing operation will now be described in brief.

The digital write signal processor 30a generates an ECC block by adding an encoding and error correction parity to input coded data to provide a desired reliability for recording/reproduction of the input coded data. The channel bit encoder 40 converts a digital bit stream outputted from the digital write signal processor 30a into a pulse-width-modulated (PWM) signal capable of being written on the optical disc 10. The PWM signal is applied to the optic drive 41. The microcomputer 70 controls the optic drive 41 to output a write signal, in accordance with an optical drive current corresponding to the variation of the writing power based on the power update information.

Thus, the optic drive 41 outputs a signal of write data in accordance with optical drive power. corresponding to the PWM signal applied thereto. The optical pickup 20 writes the write signal on the data area of the optical disc 10.

Accordingly, it is possible to avoid write failure when a writing operation is carried out in a high speed mode for an optical disc having a large material characteristic deviation. between its inner and outer peripheral portions while being adapted for a low speed mode, while obtaining superior reproduction characteristics.

FIG. 5 illustrates an example of power update information stored in association with diverse disc types. Now, another embodiment of the method for controlling the writing power of the optical disc in accordance with the present invention will be described with reference to FIG. 5.

As shown in FIG. 5, stored in the ROM 71 are respective points P and power update information associated with each point P in association with various writing speeds for each disc type. FIG. 5 illustrates the power update information for an optical disc adapted for a 4X speed mode.

When the optical disc 10 is loaded into the recording/reproducing apparatus, and subsequently rotated, the microcomputer 70 detects and identifies a point P stored in association with the disc type of the optical disc 10 and a required writing speed, and a power variation rate, from the power update information stored in the ROM 71. For example, when P is 20:00:00, the required writing speed is 32X and the power variation rate is 0.08 mW/min.

When the current writing position corresponds to the detected/identified point P during the writing operation in the required writing speed, the microcomputer 70 performs the above described power updating operation from the current writing position until the writing operation is completed. That is, the microcomputer 70 performs the writing. operation while increasing the writing power by 0.08 mW at intervals of 1 minute from the current writing position, based on the detected power variation rate when P is 20:00:00.

The power variation rate to be stored may be a value obtained by detecting a variation in writing power at intervals of a certain time while starting the detection from the point P.

As is apparent from the above description, the present invention provides an apparatus and method for controlling the writing power of an optical disc in which, when data is to be written in a high speed mode on an optical disc having a large material characteristic deviation between its inner and outer peripheral portions while being adapted for a low speed mode, the data writing is carried out while varying writing power based on. power update information previously detected and stored, thereby being capable of avoiding write failure while obtaining superior reproduction characteristics.

Numerous additional modifications and variations of the present invention are possible in light of the above teachings. It is therefore to be understood that within the scope of the appended claims, the invention may be practiced otherwise than as specifically described herein.

What is claimed is:

1. A method for recording data on an optical disc comprising the steps of:
   performing optimum power calibration on a test area of the optical disc to detect optimum writing power;
   determining an optimum write strategy;
   writing information on a data area with the optimum writing power and the optimum write strategy;

determining whether or not a running optimal power calibration (ROPC) is necessary, based on a B-level and an RF signal level detected in the writing step;

determining whether or not a current writing power is within a predetermined ROPC range set with reference to the detected optimum writing power; and terminating the ROPC and performing a writing operation by increasing the writing power based on power update information when the current writing power is larger than an upper bound of the predetermined ROPC range.

2. The method according to claim 1, wherein the determining step comprises the steps of comparing a current writing position with previously stored position information corresponding to the predetermined ROPC range, and determining, based on the result of the comparison, whether or not the current writing power is within the predetermined ROPC range set with reference to the detected optimum writing power.

3. The method according to claim 2, wherein the position information corresponding to the predetermined ROPC range is detected based on a disc type or a writing speed associated with the optical disc.

4. The method according to claim 2, wherein the current writing position is detected from absolute time in pre-groove data detected from a wobble signal generated in association with the optical signal.

5. The method according to claim 2, wherein the power update information includes information about a variation in writing power at a predetermined writing interval.

6. The method according to claim 1, wherein the predetermined ROPC range of the writing power and/or the power update information is detected based on a disc type and a writing speed associated with the optical disc.

7. The method according to claim 1, wherein the power update information includes power information based on position information.

8. The method according to claim 1, wherein the step of increasing the writing power based on the power update information is curried out when the writing operation is performed at a writing speed higher than an appropriate writing speed of the optical disc.

9. The method according to claim 1, further comprising performing the writing operation with the writing power controlled to maintain a reflection signal level corresponding to the detected optimum writing power when the current writing power is within the predetermined ROPC range.

10. An apparatus for recording data on an optical disc, comprising:

a performing unit for performing optimum power calibration on a test area of the optical disc to detect optimum writing power;

an optimum write strategy determining unit for determining an optimum write strategy;

a writing unit for writing information on a data area with the optimum writing power and the optimum write strategy;

a running optimal power calibration determining unit for determining whether or not a running optimal power calibration (ROPC) is necessary, based on a B-level and an RF signal level detected in the writing unit;

a determining unit for determining, in a writing operation of the writing unit, whether or not a current writing power is within a predetermined ROPC range set with reference to optimum writing power; and a controller for terminating the ROPC and increasing the writing power based on power update information when the current writing power is larger than an upper bound of the predetermined ROPC range.

11. The apparatus according to claim 10, further comprising:

means for detecting a current writing position from absolute time in pre-groove data detected from a wobble signal on the optical disc.

12. The apparatus according to claim 11, wherein the determining unit compares the current writing position with previously stored position information corresponding to the predetermined ROPC range, and determines, based on the result of the comparison, whether or not the current writing power is within the predetermined ROPC range set with reference to the optimum writing power.

13. The apparatus according to claim 10, wherein the previously stored position information of the predetermined RPOC range and/or the power update information is detected based on a disc type and/or a writing speed.

14. The apparatus according to claim 10, wherein the power update information includes power information correspond to position information, respectively.

15. The apparatus according to claim 10, wherein the power update information includes information about a variation of increase in writing power at a predetermined writing interval.

16. The apparatus according to claim 10, wherein increase of the writing power based on the power update information by the controller is carried out when the writing operation is performed at a writing speed higher than an appropriate writing speed of the optical disc.

17. The apparatus according to claim 10, wherein the controller controls the writing power to maintain a reflection signal level corresponding to the optimum writing power when the current writing power is within the predetermined ROPG range based on the result of the determining unit.

* * * * *